United States Patent [19]

Hein et al.

[11] 4,439,493

[45] Mar. 27, 1984

[54] MULTILAYER HEAT SEALABLE ORIENTED PACKAGING FILM AND METHOD OF FORMING SAME

[75] Inventors: Carl C. Hein, Pittsford; John R. Wagner, Jr., Rochester; Mark S. Powell, Egypt, all of N.Y.

[73] Assignee: Mobil Oil Corporation, New York, N.Y.

[21] Appl. No.: 463,744

[22] Filed: Feb. 4, 1983

[51] Int. Cl.³ .................... B32B 27/08; B32B 27/30; B32B 27/32; B65D 65/40
[52] U.S. Cl. .................................. 428/414; 426/127; 428/504; 428/516; 428/522; 428/910; 428/473.5; 428/704
[58] Field of Search ................ 426/127; 428/411, 414, 428/504, 516, 522, 910

[56] References Cited

U.S. PATENT DOCUMENTS

| | | | |
|---|---|---|---|
| 3,932,693 | 1/1976 | Shaw et al. | 426/127 |
| 4,161,562 | 7/1979 | Yoshikawa et al. | 426/127 |
| 4,178,401 | 12/1979 | Weinberg et al. | 426/127 |
| 4,214,039 | 7/1980 | Steiner et al. | 428/411 |
| 4,291,092 | 9/1981 | Weiner | 428/516 |
| 4,352,850 | 10/1982 | Yamamoto et al. | 428/516 |
| 4,364,989 | 12/1982 | Moyle | 426/127 |
| 4,384,024 | 5/1983 | Mitchell | 428/516 |
| 4,391,862 | 7/1983 | Bornstein et al. | 428/522 |
| 4,400,428 | 8/1983 | Rosenthal et al. | 428/516 |

Primary Examiner—James C. Cannon
Attorney, Agent, or Firm—A. J. McKillop; M. G. Gilman; J. F. Powers, Jr.

[57] ABSTRACT

A multilayer oriented heat sealable film structure comprising a polyolefin film substrate, a coextruded layer of random copolymer of ethylene and propylene, a primer layer on said random copolymer layer and a layer of heat sealable acrylic interpolymer on said primer layer.

12 Claims, No Drawings

MULTILAYER HEAT SEALABLE ORIENTED PACKAGING FILM AND METHOD OF FORMING SAME

BACKGROUND OF THE INVENTION

This invention relates to a flexible multilayer heat sealable general purpose packaging film and to a method of forming the same.

In the packaging of certain types of foods, for example, loose products such as cookies, potato chips, and the like, it is common practice to employ a multilayer film having two or more polymeric layers wherein one of the layers is known to be an effective heat seal layer. In the packaging process, a supply of such a multilayer film can be shaped into a tube in a vertical form and fill machine. Marginal regions of the heat seal layer are brought into face to face relationship and heat sealed together. Thereafter, the packaging machine automatically forms a heat seal and makes a horizontal severance across the bottom of the bag; product is dispensed into the open end of the tube and thereafter a second horizontal seal is effected across the tube with a simultaneous severing through the tube to result in a product packaged in a tube, heat sealed at both ends and along one seam at right angles to the end seals. While the food or other product is being dispensed into the package, air is also present in the package and this air assists in protecting and cushioning the product during subsequent shipment of the finished packages. During shipment of the product, particularly with larger size bags, e.g., those containing 16 ounces of product, the bags have a tendency to split or burst at the end seals.

A multilayered wrapping film of the type having the above mentioned utility is described in U.S. Pat. No. 4,214,039, the subject matter of which is, in its entirety, incorporated by reference herein. This patent describes a packaging film structure comprising a polypropylene film substrate having a heat sealable vinylidene chloride polymer containing at least 50% by weight of vinylidene chloride. In between the polypropylene film and the vinylidene chloride polymer is a primer coat which consists of the reaction product of an acidified aminoethylated vinyl polymer and an epoxy resin. This primer coat enhances the bond strength between the polypropylene and the heat sealable vinylidene chloride polymer. While this packaging material is effective for the packaging of comparatively small quantities of product, there exists a need to increase its seal strength when used for the packaging of comparatively large quantities of product. Particularly there is a need to increase the seal strength between the polypropylene layer and the primer layer.

SUMMARY OF THE INVENTION

In accordance with the present invention, an oriented heat sealable multilayer structure is provided which comprises:

(I) a substrate comprising a polyolefin film;

(II) a layer on at least one surface of (I), said layer consisting essentially of a random copolymer of ethylene and propylene containing from about 0.5 to about 6% by weight of ethylene;

(III) a primer coating on at least one surface of said layer (II); and (IV) a heat sealable layer on said coating (III), said heat sealable layer comprising an interpolymer of (a) a minor amount by weight of acrylic acid, methacrylic acid or mixtures thereof and (b) a major amount of neutral monomer esters comprising (1) methyl acrylate or ethyl acrylate and (2) methyl methacrylate.

In a preferred form of the above identified structure it comprises:

(I) a substrate comprising a polyolefin film;

(II) a layer on both surfaces of (I), said layer consisting essentially of a random copolymer of ethylene and propylene containing from about 0.5 to about 6% by weight of ethylene;

(III) a primer coating on both surfaces of (II); and (IV) a heat sealable layer on one surface of (III), said layer comprising an interpolmer of (a) a minor amount by weight of acrylic acid, methacrylic acid or mixtures thereof and (b) a major amount of neutral monomer esters comprising (1) methyl acrylate or ethyl acrylate and (2) methyl methacrylate; and (V) a heat sealable layer on the other surface of (III), said layer comprising a vinylidene chloride copolymer containing at least 50% by weight of vinylidene chloride.

The method for producing the heat sealable multilayer film structure of the present invention comprises:

coextruding a substrate layer comprising a polyolefin film with a layer consisting essentially of a random copolymer of ethylene and propylene on at least one side of said polyolefin substrate, said copolymer containing from about 0.5 to about 6% by weight of ethylene and about 94 to about 99.5% by weight of propylene;

biaxially orienting the coextrudate;

applying a primer coating to the surface of at least one random copolymer layer;

applying a heat sealable layer on said primer coating, said heat sealable layer comprising an interpolymer of (a) a minor amount by weight of acrylic acid, methacrylic acid or mixtures thereof and (b) a major amount of neutral monomer esters comprising (1) methyl acrylate or ethyl acrylate and (2) methyl methacrylate; and aging the structure for a time and at a temperature sufficient to yield a heat seal strength between facing heat sealed layers greater than that obtained in the absence of said aging. In a preferred method, the aging of the multilayer structure is for a period of time of from about 24 hours to about 21 days at a temperature of from about 32° F. to about 150° F. Alternatively the two different heat seal layers, defined above, can be applied to opposite sides of the primered structure in the same manner.

DESCRIPTION OF THE PREFERRED EMBODIMENTS

The polyolefins contemplated as the substrate or core material of the subject film structure include polyethylene, polypropylene, polybutene and copolymers and blends thereof. Particularly preferred is an isotactic polypropylene containing at least 80% by weight of isotatic polypropylene. It is preferred that the polypropylene have a melt flow index of from about 4 to 8 g/10 minutes.

The ethylene propylene random copolymer contemplated herein is conveniently formed by the simultaneously polymerization of the respective monomers. Effective formation of a random copolymer of ethylene and propylene is accomplished when the ethylene is present simultaneously with the polypropylene in an amount sufficient to result in from 0.5 to about 6% by weight of ethylene in the resulting copolymer. This system is characterized by random placement of the respective monomer units along the polymer chain. This is in contrast with a block copolymer of ethylene and propylene formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of soluble random copolymer.

In preparing the multi-ply structure of the present invention, the polypropylene and the ethylene propylene copolymer are coextruded so that the ethylene propylene copolymer layer is from about 2 to about 12% of the total thickness of the two layers. For some purposes, a layer of the copolymer can be on both surfaces of a core layer of polypropylene in which case the two copolymer layers would amount to from 4 to 24% of the total thickness of the three layers. In preparing the coextruded film it has been found advantageous and convenient to recycle certain quantities of scrap extrudate back into the base homopolymer polypropylene. Thus, the homopolymer polypropylene can have from 0 to 25% of reclaimed material interblended therein. This recycle material can contain from 0 to about 15% of the ethylene propylene copolymer therein.

It has been found that the heat seal layers contemplated herein do not adhere well to polyolefin film surfaces even when the later have been subjected to well known pretreatment operations such as, for example, treatment by corona discharge, flame, or oxidizing chemicals. The same has been found to be true in adhering the heat seal layers contemplated herein to the surface of the contemplated ethylene propylene copolymers. It has been found, however, that the use of certain primers intermediate between the ethylene propylene copolymer and the heat seal layer provides an unexpectedly high level of adherence. As a result all layers adhere to its adjacent layer with unexpectedly high tenacity.

The system contemplated for the formation of the multilayer packaging material of the present invention involves the use of three layers applied in succession to the surface of the chosen substrate layer. For example, when the substrate layer is polypropylene one or both surfaces of the polypropylene film will have applied thereto the following layers progressing in order outwardly from the surface of the polypropylene: a coextruded layer of ethylene propylene copolymer, and appropriate primer material (to create a bond between the ethylene propylene copolymer and a surface heat seal layer) and the heat seal layer itself. Examples of primer materials include those defined in U.K. Pat. No. 1,134,876 which discloses a primer produced by condensing a monoaldehyde with an interpolymer of acrylamide or methacrylamide and at least one other unsaturated monomer; and those defined in U.K. Pat. No. 1,174,328 which discloses a material resulting from condensing amminoaldehyde with acrylamide or methacrylamide and subsequently interpolymerizing the condensation product with at least one other unsaturated monomer in the presence of a $C_1$-$C_6$ alkanol. A preferred primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. Another primer resin of this type is a 50% solid solution of a copolymer resin containing 38.5 parts of styrene, 44 parts of ethyl acrylate, 2.5 parts of methacrylic acid and 15 parts of acrylamide which has been condensed waith 5.2 parts of formaldehyde in n-butanol.

A particularly preferred primer material for the acrylic type heat seal layers contemplated herein has been found to be poly(ethylene imine). The imine primer provides an overall adhesively active surface for thorough and secure bonding with the subsequently applied heat seal composition of this invention. It has been found that an effective coating solution concentration of the poly(ethylene imine) applied from either aqueous or organic solvent media, such as ethanol is a solution comprising about 0.1–0.6% by weight of the poly(ethylene-imine). A commercially available material of this type is known as Polymin M, a product of BASF-Wyandotte Corp.

Another particularly preferred primer material is the reaction product of an epoxy resin and an acidified amminoethylated vinyl polymer. The contemplated epoxy resins are glycidyl ethers of polyhydroxy compounds. Typical polyhydroxy compounds which may be used include bisphenol A, ring substituted bisphenol A, resorcinol, hydroquinone, phenol-formaldehyde, novolac resins, aliphatic diols, such as ethylene glycol, propylene glycol, 1,4-butanediol, 1,6-hexane-diol, glycerol, lower alkyl hydantoins and mixtures thereof. The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from 170 to 280 may be used in the present invention, but the preferred range is 180 to 210.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer compositions of the present invention is an amino modified acrylic polymer which is water soluble. This polymer is a curing agent for the epoxy compound. The preferred material is described in U.S. Pat. No. 3,719,629, the disclosure of which is incorporated herein by reference. This material may be generically described as an acidified aminoethylated interpolymer having pendent aminoalkylate groups. This material is produced by polymerizing acrylate, methacrylate, styrene or other suitable monomers with sufficient methacrylic or acrylic acid to give a —COOH content of about 7.5 to about 12.5%. Solvent polymerization techniques are preferred. The polymer is then reacted with ethyleneimine monomer and acidified with hydrochloric acid to render the polymer water soluble.

In one embodiment of the present invention, a liquid epoxy resin is emulsified in a solution of the curing agent by rapid stirring, the resultant dispersion is diluted with water to the desired concentration for coating, usually from about 2 to about 25% solids. When mixing the epoxy resin with the curing agent, it is generally preferred to use a stochiometric equivalent balance of epoxy and amine groups. However, it has been found that the stochiometric ratio may be varied over a wide range, from about one epoxy to about three amine groups through three epoxy groups to one amine group.

The composition of the heat sealable acrylic interpolymer is that defined in U.S. Pat. No. 3,753,769, the disclosure of which is, in its entirety, incorporated by reference herein. This material consists essentially of an interpolymer of from about 2 to about 15 parts, and preferably from about 2.5 to about 6 parts by weight of acrylic acid, methacrylic acid or any mixture thereof and from about 85 to about 98 parts and preferably from about 94 to about 97.5 parts by weight of neutral monomer esters, said neutral monomer esters preferably comprising (1) methyl acrylate or ethyl acrylate and (2) methyl methacrylate. The interpolymer compositions are further characterized by preferably comprising from about 30% to about 55% by weight of methyl methacrylate when said alkyl acrylate is methyl acrylate, and from about 52.5% to about 69% by weight of methyl methacrylate when said alkyl acrylate is ethyl acrylate. The monomer components of the terpolymer are employed in a ratio such that the alkyl methacrylate monomer is present in an amount of at least 10% by weight of the total terpolymer composition and preferably from about 20 to about 80% by weight, and the alkyl acrylate monomer component in amounts of at least 10% by weight of the total composition, and preferably from about 80 to about 20% by weight.

As indicated above it is contemplated herein that one surface of the structure can be of the above described acrylic heat seal material and the opposite surface can be of a vinylidene chloride polymer heat seal material. Commercially available vinylidene chloride latexes having a vinylidene chloride content of at least 50% and preferably from about 75% to about 92% may be employed. The other ethylenically unsaturated comonomers may include alpha, beta-ethylenically unsaturated acids, such as acrylic and methacrylic acids; alkyl esters containing 1-18 carbon atoms of said acids, such as, methylmethacrylate, ethyl acrylate, butyl acrylate, etc. In addition, alpha, beta-ethylenically unsaturated nitrile such as acrylonitrile and methacrylonitrile can be employed. In addition, monovinyl aromatic compounds such as styrene and vinyl chloride may be employed.

Specific vinylidene polymer latexes contemplated comprise: 82% by weight vinylidene, 14% by weight ethyl acrylate and 4% by weight acrylic acid. Alternatively, a polymer latex comprising about 80% by weight vinylidene chloride, about 17% by weight methylacrylate and about 3% by weight methacrylic acid can likewise be employed. In addition, the heat seal compositions described in U.S. Pat. No. 4,058,649, the disclosure of which is incorporated herein by reference in its entirety, can be employed.

The multiply structure of the present invention can have an overall thickness within a wide range, but it is preferably from about 0.5 up to about 1.75 mils in thickness. When the substrate is the homopolymer polypropylene it can have a film thickness of approximately 1 mil. In this instance the associated coextruded copolymer of ethylene and propylene can be present in a thickness of from about 0.02 to about 0.12 mils.

The primer dispersion, to be applied to the surface of the ethylene propylene copolymer layer, can have a solids concentration of from about 0.1% up to about 25%. The primer dispersion can be applied to the surface of the ethylene propylene copolymer layer utilizing standard coating techniques so that a dry coating weight of from about 0.05 up to about 0.25 gram/1,000 square inches of film is obtained. The thus coated film can be subsequently passed through a hot air oven to completely remove water and/or a solvent. Subsequently, this primer coated film can be coated with the appropriate heat seal polymer latex also using standard coating techniques, such as, graveur, roll coating, and the like. The heat seal coated system can thereafter be dried by passing it through a conventional hot air oven.

The amount of acrylic polymer applied to the substrate may be varied over a wide range depending upon the specific properties desired in the final film product. Coating weights of from about 1 to about 6 grams per 1,000 square inches may be employed. If a 2-sided coated film is desired, optional but beneficial corona treating of the ethylene propylene copolymer coated substrate, the priming and the opposite heat seal polymer application can be repeated, either in-line or out-of-line.

In the following examples, the base films, i.e., the homopolymer polypropylene of Example 1, the coextruded system of Example 2 and the polymer blend of Example 3, are all biaxially oriented by conventional means. In general, this includes forming the base film in sheet form and machine direction orienting (MDO) or stretching the same at the appropriate or optimum temperature, using transport rollers operating at different speeds. After the desired degree of MDO, the film is transverse direction oriented (TDO), for example, in a tentering apparatus, to impart an orientation or stretching which is at right angles to the MDO. The extent of orientation can be from about 3 to about 10 times its original dimension for the MDO and from about 3 to 10 times in the TDO.

For the base film of Example 2, the random ethylene propylene copolymer can be applied to the propylene film after the polypropylene has been machine direction oriented. In this event, the copolymer will only be transversely oriented while the polypropylene is biaxially oriented. The techniques of U.S. Pat. Nos. 3,620,825 and 3,671,383 (the disclosures of which are incorporated herein in their entirety by reference) can be employed in this respect.

In the following examples the ESM heat seal test is a heat seal test designed to simulate conditions under which films might be sealed in a typical over-wrapping machine. For the test two strips of film are cut, 3 by 14 inches, with the long direction being in the machine direction orientation of the film. The two strips of film are superimposed with coated surfaces, i.e. the acrylic surfaces, in contact and placed in a heat sealing machine with one movable heat sealing platen. On actuation, the heated platen lowers and contacts the film combination for a controlled period of time. The pressure used is that resulting from the force of a pressure cylinder set at about 5 psi and the time of contact is two seconds. A plurality of separate seals are simultaneously made on each strip of film. The film strips are cut one inch wide and the seal strengths are determined by placing the free ends of the film in the jaws of a Sutter testing machine and pealing the seals apart at a rate of 20 inches per minute. The maximum force in grams is recorded as the heat seal strength.

Also, with respect to the following examples, a crimp seal test is carried out. This is designed to simulate conditions encountered in a device known in the industry as a "vertical form-and-fill" packaging machine. This type of machine is designed to horizontally crimp seals cross a tube of packaging, material dispense product into the tube, and, thereafter, again horizontally crimp seal the opposite end of the tube to form a filled, sealed tubular package. Simulaneously with the sealing of the tube, the tube is severed. In the crimp seal test two heated platens with serrated surfaces are brought together by air pressure at 20 pounds per square inch on either side of the film strips for three-quarters of a second, then separated. Testing of the seals is carried as above.

EXAMPLE 1

A biaxially oriented homopolymer isotactic polypropylene film of an approximately 1.25 mil thickness was coated with a conventional poly(ethylene imine) primer. The dry coating optical density of the primer material was equivalent to about 0.15 optical density. To the surface of the primer was applied a heat seal layer from an aqueous solution comprising a terpolymer resulting from the polymerization of about 51% by weight methyl methacrylate, about 45% by weight of methyl acrylate and about 4% by weight of methacrylic acid. The aqueous solution also contained finely divided carnauba wax in the amount of 4 parts per 100 parts of the acrylic terpolymer. In addition, finely divided talc was included in the solution in the amount of 0.5 parts per 100 parts of the acrylic terpolymer. The coating was dried to yield a coating weight of approximately 0.60 grams per 1,000 square inches of film.

EXAMPLE 2

Example 1 was repeated except that the primer composition and the heat seal polymer composition were deposited onto the ethylene propylene copolymer surface of a coextruded biaxially oriented composite film of the same polypropylene as in Example 1 and an ethylene propylene random copolymer. THe ethylene propylene copolymer contained approximately 3.5% by weight of ethylene and a melt flow of about 7. The combined thickness of the coextruded film was approximately 1.25 mil with the ethylene propylene copolymer amounting to approximately 6% of the total thickness.

EXAMPLE 3

For this example, a base material was prepared by melt blending into homopolymer polypropylene, approximately 6% by weight of the ethylene propylene random copolymer utilized in forming the coextruded base film of Example 2. Thus, the base film in the example, contained approximately 94% by weight of homopolymer polypropylene and 6% by weight to the ethylene propylene random copolymer. The primer of Example 1 was applied directly to the surface of this base film in the same amount as in Example 1 and the acrylic terpolymer of Example 1 was applied to the primer as in Example 1.

Crimp seals and ESM seals were formed in the manner described above by placing the terpolymer surfaces of the strips of the structures of Examples 1, 2, and 3 in face to face relationship. Table I and Table II compare the strength of the seals obtained utilizing the materials of the examples.

TABLE I

| Crimp Seals 20 psi; ¾ sec. dwell (gm/in) | | |
|---|---|---|
| | 260° F. | 280° F. |
| Example 1 | 490 | 523 |
| Example 2 | 755 | 950 |
| Example 3 | 470 | 485 |

TABLE II

| ESM Seals 5 psi; 2 sec. dwell (gm/in) | |
|---|---|
| | Average 250-290° F. |
| Example 1 | 295 |
| Example 2 | 544 |
| Example 3 | 280 |

It is clear by the above showing that the heat seal strength of the film structure of Example 2 is significantly greater than that of either Example 1 or Example 3.

EXAMPLE 4

Examples 1, 2, and 3 were repeated except that the primer composition was altered as follows: The films of Examples 1, 2 and 3 were coated with the primer reaction product of the acidified aminoethylated vinyl polymer and epoxy resin of Example 5 of the aforementioned U.S. Pat. No. 4,214,039. The dry coating optical density of the primer material was equivalent to about 0.25 optical density. To the surface of the dried primer was applied a heat seal layer from an aqueous solution as mentioned in Example 1. ESM and crimp seals were formed as described above. The results are shown in Tables III and IV.

| Crimp Seals 20 psi; ¾ sec. dwell (gm/in) | | |
|---|---|---|
| | 260° F. | 280° F. |
| Example 1a | 400 | 428 |
| Example 2a | 713 | 830 |
| Example 3a | 410 | 420 |

| ESM Seals 5 psi; 2 sec. dwell (gm/in) | |
|---|---|
| | Averaqe 250-290° F. |
| Example 1a | 318 |
| Example 2a | 554 |
| Example 3a | 321 |

Again it will be noted that the heat seal strength of the material of Example 2a is significantly greater than the heat seal strength of the material of either Example 1a or Example 3a.

It has been determined, during the development of the subject multi-ply film structure, that after the application of the primer layer and the heat seal layer, a certain aging period of time and temperature must be observed in order to obtain the outstandingly high heat seal bond that results from the present invention. If heat seals are effected shortly following the formation of the multi-ply film structure, a bond strength significantly lower than that obtained upon aging will result. Optimum aging can be accomplished over a period of time ranging from about 24 hours to about 21 days with the material held at a temperature ranging from about 32° F. to about 150° F. It should be understood that the higher aging temperatures will permit the length of time to be generally correspondingly shorter.

Although the present invention has been described with preferred embodiments, it is to be understood that modifications and variations may be resorted to without departing from the spirit and scope of this invention. Such variations and modifications are considered to be within the purview and scope of the appended claims.

What is claimed is:

1. A heat sealable multilayer structure comprising:
    (I) a substrate comprising a polyolefin film;
    (II) a layer on at least one surface of (I), said layer consisting essentially of a random copolymer of ethylene and propylene containing from about 0.5 to about 6% by weight of ethylene;
    (III) a primer coating on at least one surface of said layer (II); and
    (IV) a heat sealable layer on said coating (III), said heat sealable layer comprising an interpolymer of (a) a minor amount by weight of acrylic acid, methacrylic acid or mixtures thereof and (b) a major amount of neutral monomer esters comprising (1) methyl acrylate or ethyl acrylate and (2) methyl methacrylate.

2. The structure of claim 1 wherein said polyolefin film is oriented and comprises homopolymer polypropylene interblended with from 0 to about 15 parts by weight of said random copolymer.

3. The structure of claim 2 wherein said random copolymer is coextruded on said substrate.

4. The structure of claim 3 wherein said primer comprises a member selected from the group consisting of poly(ethylene imine); the reaction product of an acidified aminoethylated vinyl polymer and an epoxy resin; the condensation product of a monoaldehyde with an interpolymer of acrylamide or methacrylamide and at least one other unsaturated monomer; and the condensation product of aminoaldehyde with acrylamide or methacrylamide interpolymerized with at least one other unsaturated monomer in the presence of a $C_1$-$C_6$ alkanol.

5. The structure of claim 4 wherein said coextruded layer (II) is on one surface of substrate (I).

6. The structure of claim 4 wherein said coextruded layer is on both surfaces of substrate (I).

7. The structure of claim 2 wherein said substrate is biaxially oriented and said random copolymer is uniaxially oriented.

8. A heat sealable multilayer structure comprising:
    (I) a substrate comprising a polyolefin film;
    (II) a layer on both surfaces of (I), said layer consisting essentially of a random copolymer of ethylene and propylene containing from about 0.5 to about 6% by weight of ethylene;
    (III) a primer coating on both surfaces of (II); and
    (IV) a heat sealable layer on one surface of (III), said layer comprising an interpolymer of (a) a minor amount by weight of acrylic acid, methacrylic acid or mixtures thereof and (b) a major amount of neutral monomer esters comprising (1) methyl acrylate or ethyl acrylate and (2) methyl methacrylate; and
    (V) a heat sealable layer on the other surface of (III), said layer comprising a vinylidene chloride copolymer containing at least 50% by weight of vinylidene chloride.

9. The structure of claim 8 wherein said polyolefin film is oriented polypropylene.

10. The structure of claim 9 wherein said primer comprises a member selected from the group consisting of poly(ethylene imine); the reaction product of an acidified aminoethylated vinyl polymer and an epoxy resin; the condensation product of a monoaldehyde with an interpolymer of acrylamide or methacrylamide and at least one other unsaturated monomer; and the condensation product of aminoaldehyde with acrylamide or methacrylamide interpolymirized with at least one other unsaturated monomer in the presence of a $C_1$-$C_6$ alkanol.

11. The structure of claim 10 wherein said layer (IV) comprises 2.5 to about 6 parts by weight of (a) and from about 97.5 to about 94 parts by weight of (b).

12. The structure of claim 11 wherein said interpolymer comprises from 30–55% by weight methyl methacrylate when said alkyl acrylate is methyl acrylate and from 52.5–67% by weight of methyl methacrylate when said alkyl acrylate is ethyl acrylate.

* * * * *